Patented June 15, 1926.

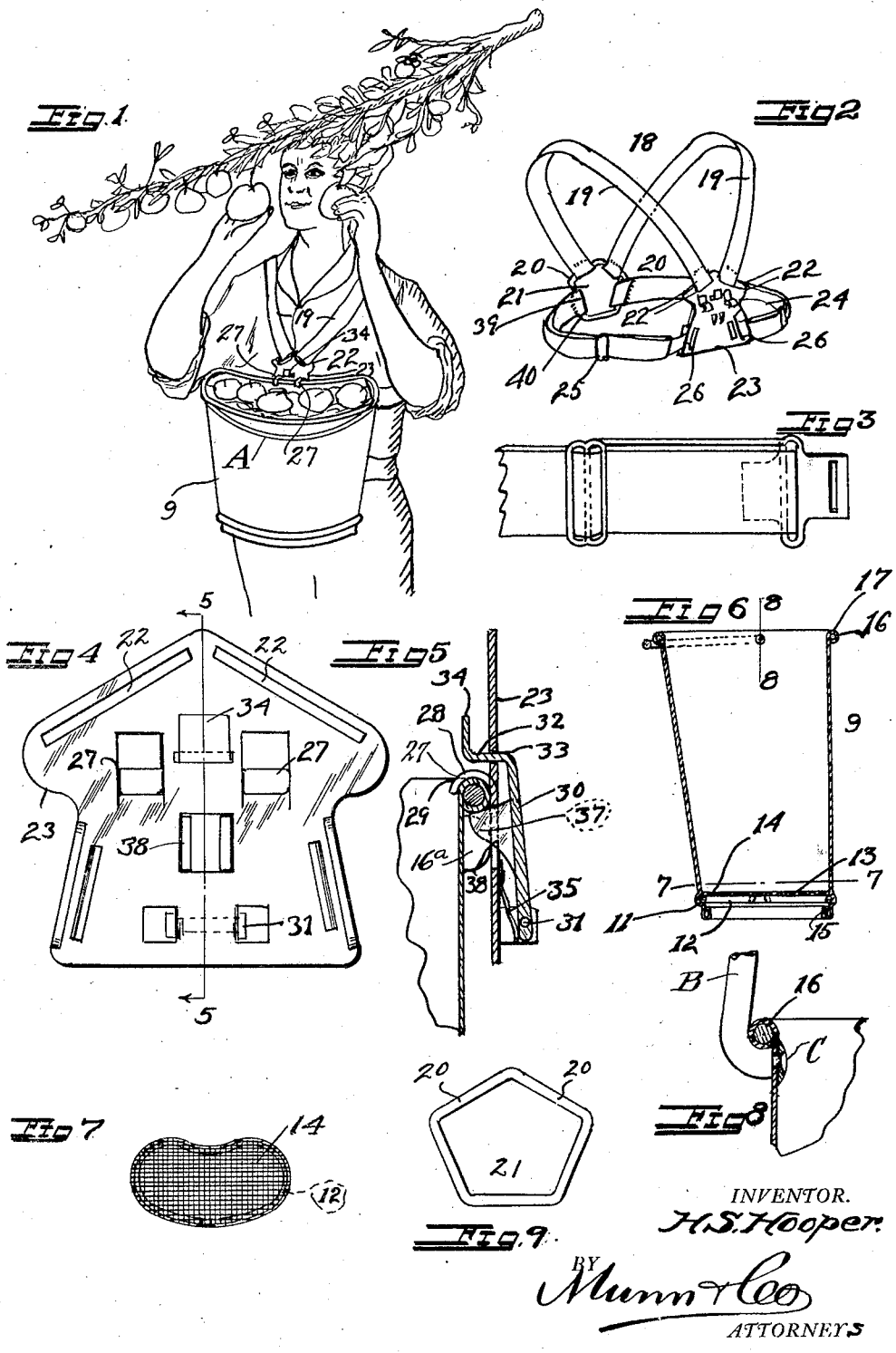

1,589,077

UNITED STATES PATENT OFFICE.

HARRY STERLING HOOPER, OF SAN FRANCISCO, CALIFORNIA, ASSIGNOR OF ONE-FOURTH TO A. L. HUMBOLDT.

FRUIT-PICKER'S RECEPTACLE.

Application filed August 27, 1923. Serial No. 659,581.

This invention relates to fruit pickers' receptacles and has for its primary object the provision of a device of this character that will eliminate the disadvantages of old and well known forms of receptacles and embodying new and useful improvements for facilitating the process of picking fruit, and permit such work to be carried on with dispatch and in such manner that will prevent undue bruising of the fruit during the picking operation.

Heretofore the practice of picking fruit consisted in the provision of an ordinary or well known form of pail which was either suspended from one arm of the operative or carried in the hand. Incident thereto it was only possible for the operative to use one hand in the picking process. The awkwardness of this method made it impossible for such work to be carried on with dispatch. The method was particularly inappropriate when the operative was compelled to proceed with his work while mounted upon a ladder. Frequently an operative resorts to the scheme of hanging the pail upon the limb of a tree and proceeds to fill same with fruit while supported in this manner. This had its disadvantages in that as the weight of the fruit was added to the pail, the limb from which the pail was supported would break, causing the pail to fall. After all fruit has been picked that can be reached from a ladder, there is usually a considerable amount of fruit remaining in the center of the tree which can only be reached by the operative climbing into the tree. Where use of the old form of pail was resorted to the several disadvantages herein referred to were attendant the picking operation and aside from the loss of time, the work could not be carried on with dispatch. Furthermore picking fruit in the manner aforesaid was extremely laborious and trying upon the operative. In addition thereto it was impossible for the operative to obtain positions of advantage so that the picking operation would be carried on with the desired speed.

An essential object of my invention is to provide a fruit picking device which essentially consists of a pail characterized by a shape which permits same to be worn in front of the operative at a point approximately near the chest and which will conform to the contour of the body so that the pail is made to fit in a comfortable manner.

A still further object of the invention is to provide a fruit picking device consisting of a pail and a coacting support or suspending device, the latter being so designed as to cause the weight or load of the fruit to be equally distributed to different points upon the body of the operative and in such manner that each will relieve the operative of the burden of being constantly subjected to the tiring effect of the load thus carried. In many forms of fruit it is the practice, particularly with cherries or fruits of extremely delicate texture, to pick same and deposit the fruit into a pail or receptacle and when the receptacle is filled the operative usually substitutes therefor a new or empty pail, in lieu of dumping the collected fruit from the pail first used and thereby avoiding the possibility of unduly damaging the fruit by frequent handling thereof. In my device I have provided a form of suspending means adapted to be arranged upon the body of the operative and which will freely accommodate itself to the pail and permit the open end of the pail to be exposed with relation to both hands of the operative so that the latter may use both hands in picking the fruit and loading the vessel or pail as the operation proceeds, the suspending means serving to permit the pail or receptacle to be freely operated from said means and an empty pail to be substituted therefor as the occasion required.

A still further object of the invention is to provide a fruit picking device essentially consisting of a pail whose upper edge is so formed as to positively prevent the bail from becoming accidentally entangled the leaves or branches of the tree during the picking operation, and in this connnection the pail is characterized by novel means which entirely eliminates the use of the customary forms of bail ears on pails of this character.

A still further object of the invention is to provide a fruit picking device essentially consisting of a pail which is strong and durable and capable of being roughly handled without prematurely showing the effects of abuse and which will be further provided with a detachable yieldable bottom which, when worn, may be quickly removed and a new bottom substituted therefor at minimum cost.

My invention, therefore, comprises certain new features of construction and arrangement and combination of elements hereinafter set forth and pointed out in the claims annexed hereto.

In the drawings:

Figure 1 is a perspective view of the device showing the same in use;

Figure 2 is a perspective view of the harness or suspending means;

Figure 3 is a perspective view of a portion of the belt of said suspending means.

Figure 4 is a view in elevation of the pail retaining device;

Figure 5 is a section on line 5—5 of Figure 4;

Figure 6 is a vertical section through the pail;

Figure 7 is a section on line 7—7 of Figure 6;

Figure 8 is a section on line 8—8 of Figure 6; and

Figure 9 is a plan view of the pentagonal ring of the suspending device.

As stated elsewhere herein the essential feature of novelty of my invention resides in the provision of a fruit picker's pail and means that will cause same to be supported from the body of an operative so that both hands of the operative may be used in the picking operation, thereby encouraging dispatch in the picking operation and also permitting the operative to gain access to parts of a tree where it has been impossible with methods employed heretofore to properly gather the fruit, particularly the central portions of the trees.

In order to accomplish the advantages aforesaid use is made of a pail (9) constructed preferably of galvanized metal of suitable gauge and provided with substantially arcuate front and rear walls whose curvatures adapt the pail to the contour of the body of the operative at a point immediately below the chest. The width of the pail at the upper end is proportioned or so calculated as to permit free vertical movements of both arms of the operative as will be clearly appreciated on reference to Figure 1.

The pail is formed at its lower end with an internal groove (11) which yieldingly receives an expansible wire frame (12). This wire frame is covered with canvas or the like (14). The construction is such that the bottom can be freely removed from the pail and a new one substituted therefor as the occasion demands. In order to facilitate the operation of adjusting the removable bottom to the pail it will be observed that the diameter of the pail increases in an upward direction so that the maximum diameter is appreciably greater than the maximum size of the bottom. Directly beneath the removable bottom of the pail the walls of the latter are upset so as to form a reinforcing bead (15).

At the upper end the walls of the pail are curved to provide a marginal bead (16) in which a reinforcing wire (17) is mounted. The purpose of this bead will be referred to hereinafter.

At (18) is illustrated a suspending device or supporting member, same being in the form of a body harness having straps (19—19) adapted to be extended over the shoulders of the operative as shown in Figure 1. At the back the free ends of said straps are connected with the branches (20—20) of a pentagonal ring (21). At the front the said straps (19—19) are connected in the angularly disposed slots (22—22) of a retaining device (23). This suspending device also includes a body embracing belt (24) which is adjustable circumferentially by providing the belt with a buckle (25). The free ends of the belt are connected at (26) to the sides of the plate (23).

The plate (23) is formed of metal of suitable gauge and same is up-struck to provide a pair or plurality of hooks (27—27). These hooks extend forwardly at (28) and downwardly at (29) so as to conform in part with the transverse configuration of the bead (16). Carried upon the reverse side of the plate (23) is a latch arm (30) pivoted at (31) to said plate and provided with an offset portion (32) movable in a slot (33) in the plate. This offset portion is formed with a manipulating lip (34). Interposed between the rear side of the plate (23) and the lower extremity of the lever (30) is a spring (35) which normally holds said latch arm in the full line position shown in Figure 5. This latch arm is provided with a pair of keeper lugs (37) which operate in a slot (38) in the plate (23) at a point below the plane of the hooks (27—27). When the latch arm is retracted in the act of attaching the pail, the pail (10) may be inserted beneath the hooks (27—27) as shown in Figure 5 and immediately thereafter the arm (30) may be released so that under the action of the spring (35) the lugs (37) will engage beneath the bead (16) to hold the latter in confinement with the coacting retaining hooks (27—27).

The rear ends of the body embracing belt

(24) are attached at (39) to the branches (20) of said pentagonal ring (21).

As the pail is concave on the inner side, and that portion of picker's anatomy against which pail rests is convex, it is apparent that the pail will fit snugly against picker's body. This result is further consummated by the method of attaching, and place of attaching, pail to support. This pail being attached at one place only, the middle of inner, concave side, it follows, naturally, that the normal downward pull exerted by weight of pail and contents is directed inward and against picker's body. From the foregoing statements it is apparent that, unless deliberately released, this pail will, under any and all circumstances, go with the picker and stay with the picker. Since the picker's hands are both free, and since his attention is not divided between the fruit and the pail, it is obvious that his eyes, his hands, and all his faculties may be concentrated on the sole work of picking fruit. Furthermore, since this pail, unless released by picker, will occupy exactly the same position under all circumstances, i. e. directly in front of picker, and fitting snugly against his chest, it is obvious that once a fruit has been picked it is only necessary to be released and it will automatically, without conscious thought or effort on the part of the picker, fall directly into the pail, owing to said pail's shape and location.

Owing to fact that support and pail are freely separable and the further fact that pail is fitted with bail, said pail may be detached, and it is intended to be detached, for the purpose of emptying. Also for the same reasons, it may be carried around in the hand or placed on the ground at suitable places for picking up windfalls.

The wearing of this device is conducive to health, because as soon as the support is adjusted in place there is an instinctive desire for the picker to draw back his shoulders and throw out his chest. This effect is heightened as weight of pail and fruit increases, because naturally, picker extends his chest still further to counteract downward pull.

Directly beneath and contiguous to bead (16) are two bosses 16ª which fit on either side of projecting catch (37) the object being to prevent pail moving to right or left.

A bail A has side portions B pivoted at C to the sides of the pail beneath the bead (16). The bail is curved to conform to the curvature of the front wall of the pail, and as shown in Figure 1, it is seen that when the pail is hung from the body of the user, the bail is swung downward, where it is out of the way and at the same time positioned where it can be readily grasped when desired. By pivoting the sides of the bail to the pail beneath the bead (16), there are no obstructions presented that could catch in the clothes of the user.

I claim:

1. In a fruit picker's device, a body engaging harness, a pail, means on said pail, a plate carried by said harness, a plurality of hooks extending from said plate, a latch member carried by the plate and adapted to coact with said hooks to hold the means of said pail clamped between said hooks and said latch member.

2. In a device of the class described a body engaging harness, a plate carried by said harness and adapted to rest against the chest of an operative, and a pail having detachable connection with said plate, said harness including straps adapted to be extended over the shoulders and a belt adapted to extend under the arms of the operative and a pentagonal ring connected with the rear ends of said straps and the rear ends of said belt.

3. In a device of the class described, a body engaging harness, a plate carried by said harness and adapted to rest against the chest of an operative, and a pail having detachable connection with said plate, said harness including straps adapted to be extended over the shoulders and a belt adapted to extend under the arms of the operative and a pentagonal ring connected with the rear ends of said straps and the rear ends of said belt, the front ends of said straps and the front ends of said belt being connected to said plate.

4. A body engaging harness, a plate carried by said harness, an arcuate pail having a marginal bead at its upper end, hooks carried by said plate and engageable with said bead, and a spring pressed latch member coacting with said hooks to secure confinement thereof with said bead.

5. A pail supporting harness for fruit pickers comprising a link and a plate respectively adapted when arranged upright to bear upon the central portion of the back and upon the chest of an operative, the said link and the plate having in their upper portions obliquely disposed structures, shoulder straps having their opposite ends connected to the obliquely disposed structures of the link and the plate and body embracing straps secured at one end to opposite portions of the link below the shoulder straps and having their opposite ends adapted for detachable connection to opposite portions of the breast plate below the shoulder strap connections.

6. A pail supporting harness for fruit pickers comprising a link and a plate respectively adapted when arranged upright to bear upon the central portion of the back and upon the chest of an operative, the said link and the plate having in their upper portions obliquely disposed structures, shoulder straps having their opposite ends connected to the obliquely disposed structures of the link and the plate, body embracing straps secured at one end to opposite portions of the link below the shoulder straps and having their opposite ends adapted for detachable connection to opposite portions of the breast plate below the shoulder strap connections, and means carried by the plate adapted for detachably engaging the rim of a bucket and further adapted to be operated from the front of the plate to disengage the bucket.

HARRY STERLING HOOPER.